United States Patent
Deleam et al.

(10) Patent No.: US 7,432,950 B2
(45) Date of Patent: Oct. 7, 2008

(54) VIDEOCONFERENCE SYSTEM

(75) Inventors: David Deleam, Perros Guirec (FR); Aurélien Sollaud, Trebeurden (FR); Jean-Claude Schmitt, Savigny S/Orge (FR); Patrick Boissonade, Gif sur Yvettes (FR); Olivieir Calliger, Paris (FR)

(73) Assignee: France Telecom S.A., Paris (FR)

( * ) Notice: Subject to any disclaimer, the term of this patent is extended or adjusted under 35 U.S.C. 154(b) by 512 days.

(21) Appl. No.: 10/493,510

(22) PCT Filed: Oct. 18, 2002

(86) PCT No.: PCT/FR02/03584

§ 371 (c)(1),
(2), (4) Date: Dec. 17, 2004

(87) PCT Pub. No.: WO03/036973

PCT Pub. Date: May 1, 2003

(65) Prior Publication Data

US 2005/0088514 A1    Apr. 28, 2005

(30) Foreign Application Priority Data

Oct. 22, 2001    (FR) .................................. 01 13630

(51) Int. Cl.
    *H04N 7/15* (2006.01)
(52) U.S. Cl. ............................... 348/14.08; 348/14.09
(58) Field of Classification Search .............. 348/14.08, 348/14.09, 14.12; 370/260, 263, 270, 261
See application file for complete search history.

(56) References Cited

U.S. PATENT DOCUMENTS 6,697,341 B1 *  2/2004 Roy ........................... 370/260

* cited by examiner

*Primary Examiner*—Stella L Woo
(74) *Attorney, Agent, or Firm*—Gerald E. Helget; Nelson R. Capes; Briggs and Morgan, P.A.

(57) ABSTRACT

A conference system of the type that comprises a bridge (10) to which a plurality of terminals (1 to 4) can be connected to participate in a conference, said bridge (10) being equipped to receive the audio and/or video and/or data flows of each terminal (1 to 4) and to retransmit them to the other terminals, wherein the flows transmitted by said terminals (1 to 4) are coded by means of hierarchical coders and wherein said bridge (10) is equipped with means (21 to 24, 210 to 243) for processing the audio/video/data flows coming from the terminals (j) so that they have a hierarchical level (q) in the flow intended for the terminal (i) and means (20) for determining said hierarchical level (q) based on decision-making criteria relating to the status of said conference system.

11 Claims, 3 Drawing Sheets

VIDEOCONFERENCE SYSTEM

CROSS-REFERENCE TO RELATED APPLICATIONS

This application is a U.S. National Stage Application of PCT/FR2002/003584, filed Oct. 18, 2002, which is based on French Patent Application 01/13630, filed on Oct. 22, 2001.

BACKGROUND OF THE INVENTION

This invention concerns a conference system of the type that comprises an audio and/or video and/or data bridge to which a multiplicity of terminals can be connected to participate in a conference. The conference bridges or central conference body (each participant is in direct relation with the bridge, and is therefore in relation with the other participants through the bridge) can, for example, be mixing bridges, multiplexing bridges or replicating bridges.

Mixing bridges are sufficiently widespread in nature that it is not necessary to describe their mode of operation here. On the other hand, the same is not true for multiplexing bridges and replicating bridges, which are beginning to be used particularly in the context of IP network conferencing.

The replicating bridge aims to replicate the audio and/or video flows from a correspondent to all the other correspondents who therefore receive several flows to be decoded. The audio flows are often mixed by the receiver before being restored, but are also sometimes each sent over different speakers. The video flows can all be displayed; we are then in a conference context in which all the participants are continuously present.

The multiplexing bridge is based on the same principle. However for a receiver X, instead of simply duplicating the flows of the other participants in order to transmit them to it, this bridge will multiplex the flows of the other participants in order to optimize flow transport by limiting the packet overhead tied to the transport layer. For example, in an IP network, instead of sending N packets corresponding to N remote participants, the multiplexing bridge will send only one packet with the multiplexed data of N remote participants, and will thus achieve a rate gain by factorizing the IP headings, which thus minimizes the packet overhead tied to the IP headers (quite often IP/UDP/RTP).

We can also envision combined mixing-multiplexing bridges or mixing-replicating bridges in order to provide the continuous presence of only M (M<=N) participants out of the N present in the conference.

One of the classic problems is allowing conferences with participants who have different transmission capacities. Indeed, by allowing the interconnection of heterogeneous networks, by offering different access rights, this results in allowing participants with different capacities that can be characterized in terms of input rates and output rates or even using terminals with different calculation capacities, to set up a conference. How, then, can participants with low rates be allowed to participate in a conference without requiring all the conference participants to adopt a mode with minimal or even mediocre quality?

In the case of replicating and/or multiplexing bridges, we realize that the rate of the flow or flows going from the bridge to the participants increases with the number of participants. How, then, can we allow someone to join the conference when the rate received by one of the participants cannot be increased given its network access while retaining the quality of the conference for the participants with network accesses that are not yet saturated?

Another problem is the adaptation of the rate of the flows transmitted to the dynamic variations of the transmission capacities of a participant. The goal being to retain a continuity in the flows transmitted and to avoid cutoffs due to losses that can be caused by saturations of the transmission link.

The current techniques do not allow us to solve these problems completely, but instead propose fall-back solutions.

Thus, when the participants do not all have the same network access capacities, a first solution consists in finding an identical conference mode for all the participants corresponding to the mode that can be accepted by all of them. We then speak of a fall-back mode. The quality of the conference is therefore limited by the participant with the lowest capacity, which is too bad for the participants potentially able to take advantage of a higher level of quality. Furthermore, this also makes it necessary to equip the equipment (terminals and bridges) with several operating modes to allow connections of different qualities. A second solution to this problem can consist in equipping the bridge with elements that play the role of gateways. This time, instead of falling back on the best common mode possible, the conference can take place in a superior mode, but the participants who do not possess the necessary capacities access the bridge via gateways that then perform code conversions. The establishment of such gateways is complex, costly and is a source of quality degradation due to the code conversion and the additional transmission delay resulting from this code conversion. Furthermore, by adding elements to the system, we potentially reduce its reliability.

In the same way, in multiplexing and/or replicating bridges, during a conference where one is already at the capacity limit for at least one of the participants, the only way to admit a new participant (who may also have limited capacities) is to fall back to a lower conference mode. Nevertheless, it is possible to establish more complex techniques. It is possible, for example, to add mixing functionalities or even to limit the number of active participants at the same time using VAD (Vocal Activity Detection) mechanisms and/or speaking authorization mechanisms.

In the case of dynamic degradations of a link, certain techniques consist in reducing the rate transmitted by modifying the behavior of the coders (this is particularly possible with classic video coders). However, taking the example of replicating bridges, a dynamic reduction in the rate of the coder will result in a degradation of this signal for all the participants, even though only one line may present problems. Therefore this solution is not ideal. Furthermore, it obligates the bridge to control the coders of certain terminals based on connections with other terminals.

SUMMARY OF THE INVENTION

The purpose of this invention it to provide conference bridges with means allowing them to solve the problems that are raised above. It is therefore to provide means that allow the management of a multimedia conference (audio and audio-video) particularly for adapting the flows transmitted to the transmission capacities of the participants in the conference and to the dynamic variations in these capacities.

The goal of this invention is also to propose a conference system in which the manipulation of data is as simple as possible, particularly by avoiding complex algorithmic processing of this data. This allows simple implementation of the invention, which does not require significant hardware and/or software resources.

In order to achieve these goals, a conference system of the type that comprises a bridge to which a multiplicity of terminals can be connected to participate in a conference, said bridge being provided to receive the audio and/or audio and/or data flows from each terminal and to retransmit them to the other terminals, is characterized, according to this invention, in that the flows transmitted by said terminals are coded by means of hierarchical coders and in that said bridge is equipped with means for processing the audio/video/data flows coming from the terminals so that they present a hierarchical level in the flow intended for the terminal and means for determining said hierarchical level based on decisional criteria related to the status of said conference system.

Advantageously, said means consist of processing units provided to truncate the payload of the packets used for the transmission so that said flows have the hierarchical level required.

According to another feature of the invention, the means determine the hierarchical level required for a terminal based on information concerning the available bandwidth on the output link between said bridge and said terminal.

According to an embodiment variant of a conference system according to this invention, the means determine the hierarchical level required for a terminal based on information concerning the available bandwidth on the output link between said bridge and said terminal and based on the number of terminals participating in the conference.

Advantageously, said means determine the hierarchical level q required for a terminal when the available bandwidth on the link between the bridge and the terminal is smaller than the rate used by the terminal to receive the hierarchical level, but is larger than the rate used by the terminal to receive the hierarchical level.

According to another embodiment variant of this invention, said means determine the hierarchical level required for a terminal based on information concerning its useful bandwidth on the output link between said bridge and said terminal, the number of terminals participating in the conference and based on the information concerning the rates transmitted by each terminal to the bridge for hierarchical levels.

Thus, advantageously, said means can determine the hierarchical level of the flow coming from a terminal for a terminal by proceeding as follows:

a) if the available bandwidth from the link to the terminal is less than the sum of the rates of the flows sent by the other terminals, the packet overheads connected to the packet headers of the flows coming from terminals being mutualized or not depending to the type of bridge considered then the hierarchical levels of the flows are not modified, b) if this is not the case, the flows transmitted by the other terminals with the highest hierarchical level have their hierarchical level decremented one unit, c) the available bandwidth from the link to the terminal is again compared to the sum of the rates of the flows sent by the other terminals with the previously determined hierarchical levels, the packet overheads connected to the headers of the packets of the flows coming from the terminals being mutualized or not depending on the type of bridge considered, d) if it is lower, the hierarchical levels are not modified any further, e) otherwise, steps b) and c) are repeated until the available bandwidth from the link to the terminal is less than the sum of the rates of the flows sent by the other terminals with the previously determined hierarchical levels.

The flows transmitted by the terminals may comprise a priority index, and step b) above involving the decrementation of the highest hierarchical levels is carried out on the flows coming from the terminals in the order of the priority indices assigned to said flows. Said priority index is, for example, binary, or more complex, defining priority classes, for example.

According to another feature of the invention, said information concerning the useful bandwidth of a terminal is static theoretical information available for said terminal. This static theoretical information can depend on the theoretical available bandwidth, the calculation capacities of said terminal considered and the access rights for said terminal.

Furthermore, said information concerning the useful bandwidth of a terminal is dynamic information. This dynamic information concerning the useful bandwidth from the link to the terminal can be dynamic information delivered by units that evaluate the physical available bandwidth.

BRIEF DESCRIPTION OF THE DRAWINGS

The features of the invention mentioned above along with others will appear clearer upon reading the following description of an example of embodiment, said description being given in relation to the appended drawings in which:

FIG. 1 represents a conference system that consists essentially of a bridge 10 to which terminals 1 to 4 participating in a conference are connected by input links LEI to LE4 for terminal hookups to the bridge, as well as output links LSI to LS4 for bridge-to-terminal hookups. The number of four terminals is given by way of illustration and at a given time t. Indeed, this number could be different from one conference to another and even during the same conference. In the remainder of the description, this number is given as N.

DETAILED DESCRIPTION OF ILLUSTRATIVE EMBODIMENTS

The basic principle of the invention is, on the one hand, to use hierarchically coded flows for the transmission of flows between the different terminals 1 to N participating in the conference, and, on the other, to decide at the level of the bridge 10 on the number of hierarchical bit groups that are then transmitted to a terminal i via the link LSi between the bridge 10 and the terminal i based on decisional criteria tied to the system, such as the number N of terminals involved in the conference, the capacity in terms of bandwidth or available static and or dynamic rate $Bp_i$ of the link LSi to a terminal i (i is an integer that can tale all the values from 1 to N), the access rights of the terminal i, the calculation capacities of terminal i, the rate transmitted $DE_j$ by the terminals j (is an integer that can take all the values 1 to N except for the value i), etc.

Figure 2:
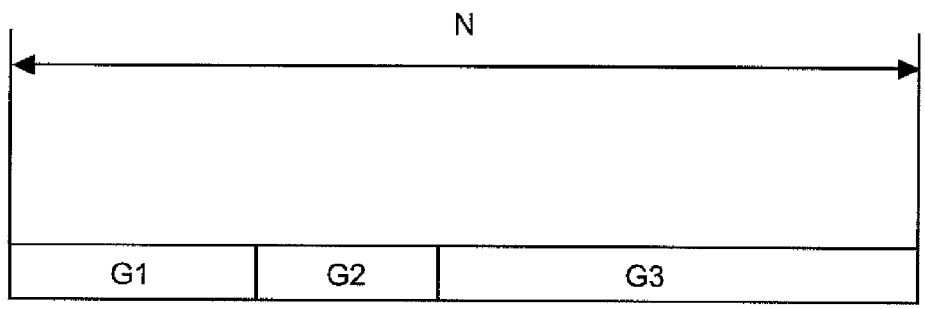
FIG. 2 is a diagram illustrating the hierarchical coding.

We recall here that a hierarchical coder, whether this involves audio signals, video or data, produces from a portion of the original signal (for example a 20 ms frame of the word signal in the case of certain audio coders) a binary bit stream represented by M bits separated into P consecutive bit groups G1 to GP ($P \geq 2$, and $P \leq M$), as represented in FIG. 2 for P=3. The first of these groups making up the base group G1 is indispensable for obtaining any decoded signal regardless of the quality required. By decoding only this base group G1, we will then have a minimal quality. The following groups G2 to GP allow consecutive quality improvements. If all the bit groups G1 to GP are transmitted, the quality is the best that can be achieved by the system. The group GP serves no purpose if the group GP-1 has not been received and so on. There is therefore a hierarchy in the bit groups generated. The bit stream from this type of coder can thus be easily cut up by truncation and this therefore makes it possible to change the rate used by the same coder while guaranteeing continuity in the signal transmitted and restored. Thus, in FIG. 2, only group G1 may be transmitted or groups G1 and G2 or all the groups G1, G2 and G3. In each of these cases, we will speak of hierarchy level 1, hierarchy level 2 or hierarchy level 3. The rate DH1 offered by hierarchy level 1 is denoted D1, the rate DH2 offered by the groups G1 and G2 combined is D1+D2 and the rate DH3 offered by groups G1 to G3 is D1+D2+D3. In general rate DHq offered by a hierarchical level q is the sum of the rates of each hierarchy level less than or equal to this level q, or $$DHq = \sum_{1}^{q} Dp.$$

Let's take, for example, a hierarchical word coder working with 40 ms frames offering 3 hierarchy levels: D1=8 kbit/s for the first group G1, D2=6 kbit/s for the second group G2 and D3=16 kbit/s for the third group G3. We therefore have a total rate of 8+6+16=30 kbit/s, or for one frame a bit stream of 150 bytes divisible into three consecutive groups G1, G2 and G3 of 40 bytes, 30 bytes and 80 bytes respectively.

The decision concerning the number of hierarchical bit groups that are transmitted to a terminal i via the link LSi between the bridge 10 and the terminal i results in an action of the bridge 10, which is to perform, based on the decisional criteria mentioned above, a truncation of the bit streams in order to reduce the flow over the link LSi to the hierarchical level desired.

According to the invention, taking the example of complete reception by the bridge 10 of the bit streams transmitted by the terminals and assuming a terminal i, the bridge 10 will send them only a portion or all of this bit stream based on the available rate capacities of the other terminals (1 to N, except for i). The manipulation of the data is quite simple, because there is no algorithmic processing to be done for the data, simply a hierarchical selection of this data.

Figure 1:
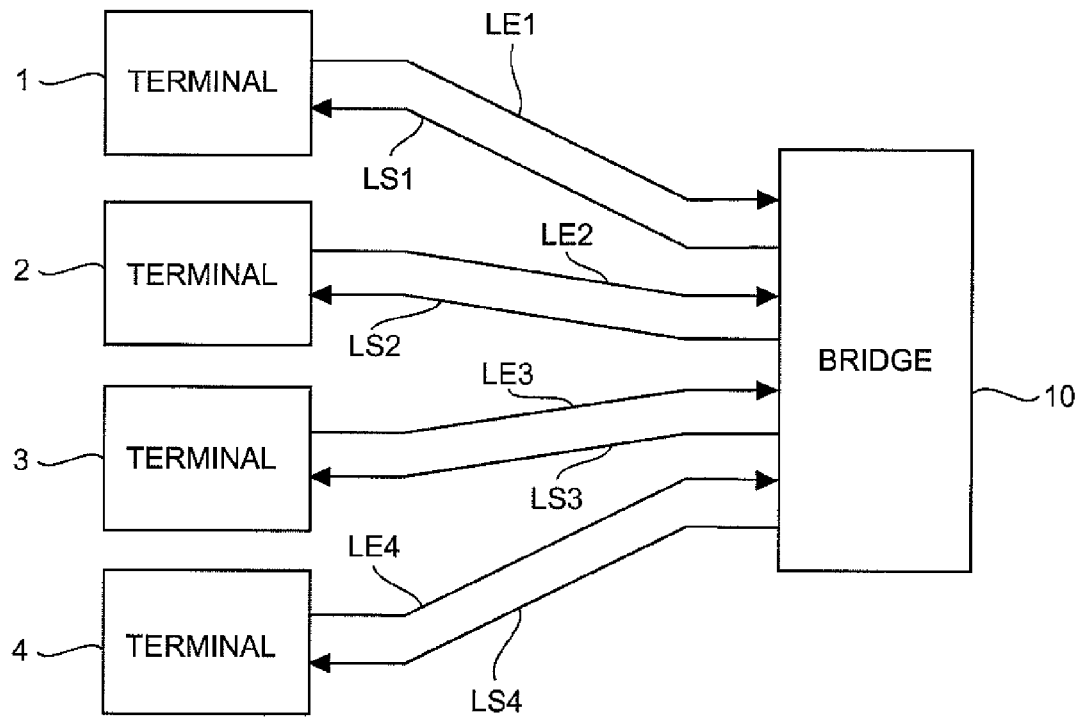
FIG. 1 is a block diagram of a conference system according to the invention.
Figure 3:
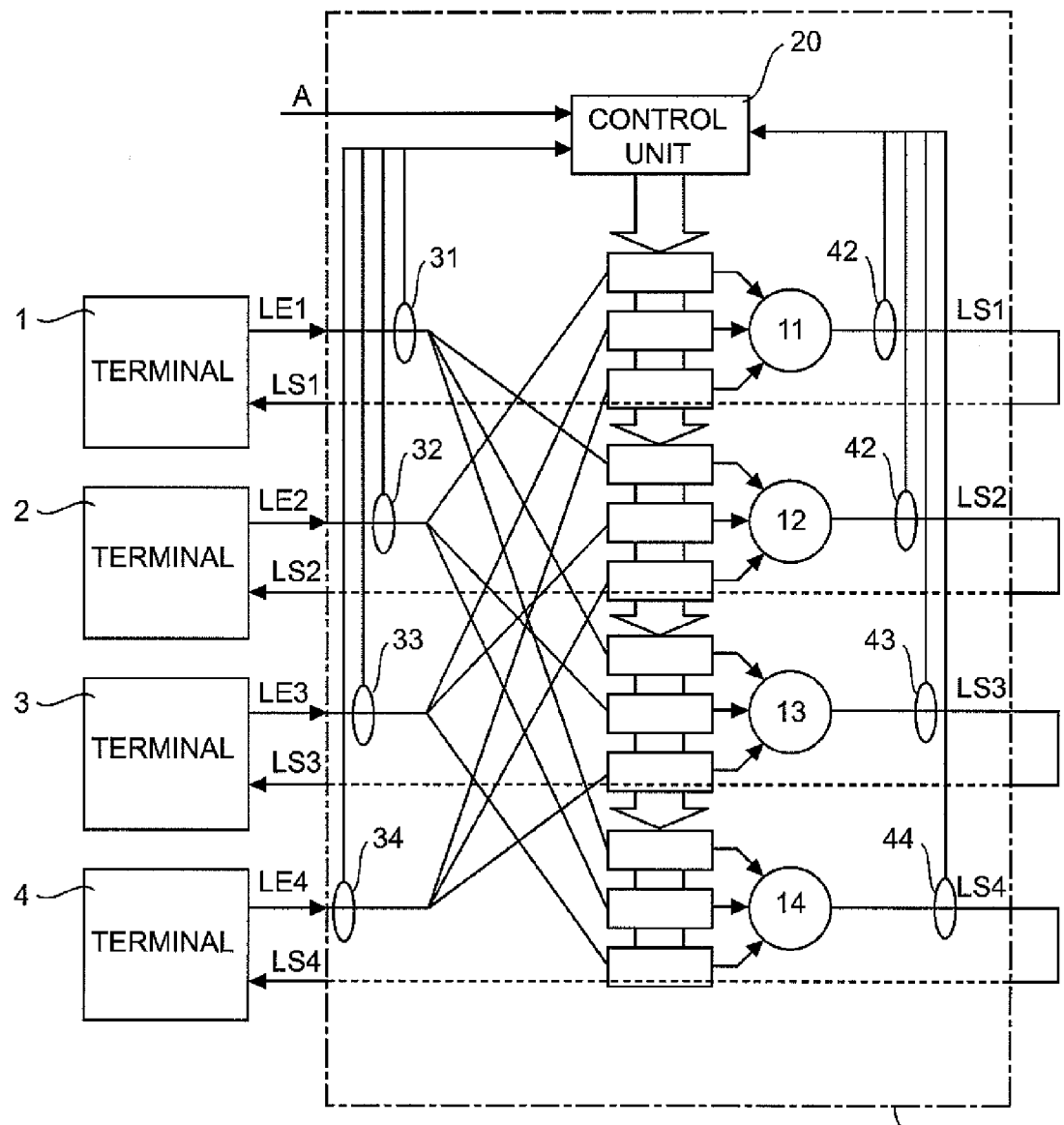
FIG. 3 is a block diagram of a first mode of embodiment of a bridge of a conference system according to the invention.

In FIG. 3, we have represented a first mode of embodiment of a bridge 10 according to the invention. Like the one in FIG. 1, the bridge 10 is capable of managing four conference terminals 1 to 4 connected to said bridge 10 by input links LE1 to LE4 for the transmission of their signals to the bridge 10, and by output links LS1 to LS4 for the transmission of the signals emitted by the bridge 10 to them. Concerning the number of terminals, let us recall here that this number may be different, it may vary from one conference to another and from one moment to another during the same conference.

The bridge 10 comprises four assembly units 11 to 14 provided respectively to assemble the audio and/or video and/or data flows received from terminals 1 to 4 other than the one that corresponds to them, these audio and/or video and/or data flows having previously been processed in processing units 212 to 243. The processing units number N×(N−1) and, in FIG. 3, they are referenced by the numbers in the 200s, the numbers in the teens corresponding to the terminal concerned, and the single-digit numbers corresponding to the associated terminal whose signals are processed: for example, the unit referenced 212 processes the flows coming from terminal 2 in order to transmit them to the terminal 1.

The assembly units 11 to 14 produce an assembly that can be a mixing, a simple replication or a multiplexing of the flows that have been processed in the processing units 212 to 243 and deliver assembled flows that are transmitted to the respective output links LS1 to LS4.

Mixing consists in mixing the different input flows coming from the terminals and in delivering a new flow resulting from this mixing. More specifically, the payloads of the packets of the input flows are mixed after decoding (complete or partial) then the mixed flow is recoded in order to form the payload of the resulting packets, these packets having their own headers.

Replication consists in replicating the incoming flows coming from each terminal to the other terminals and in delivering, to each terminal, a flow where each of the incoming flows of the other terminals is present as such.

Multiplexing consists in multiplexing the incoming flows coming from the terminals and in delivering a multiplexed flow to each terminal.

Figure 4:
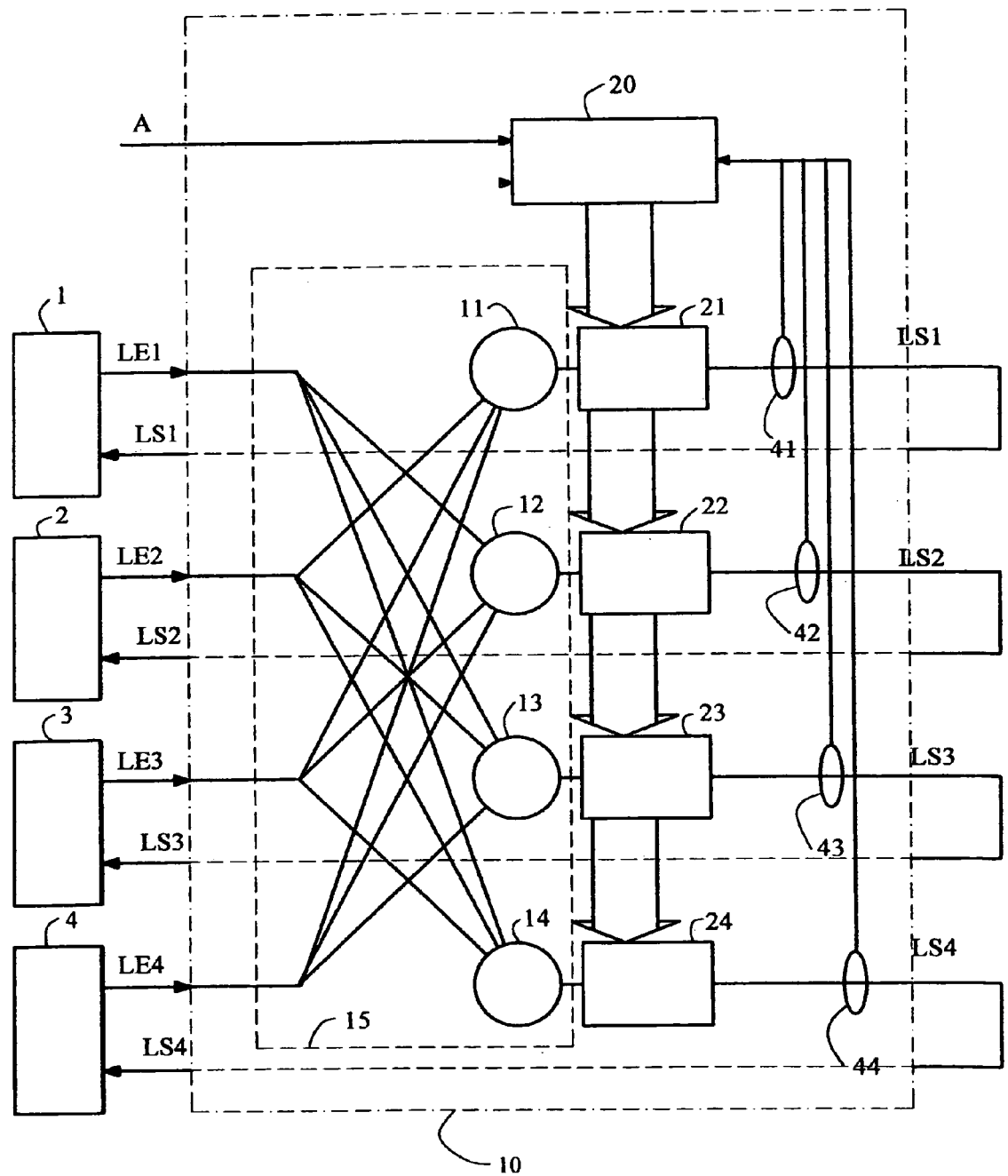
FIG. 4 is a block diagram of a second mode of embodiment of a bridge of a conference system according to this invention.

As we might imagine from the description of a second mode of embodiment in relation to FIG. 4, this mode of embodiment is more specifically suited to replicating and multiplexing bridges, that is, for which the assembly units 11 to 14 perform a simple replication or a multiplexing of the flows.

The essential function of each processing unit 212 to 243 (generally 2ij with i and j being integers and j is different from i) is to truncate or not truncate the video/audio/data flows it receives from the terminal j in order to deliver signals with a selected hierarchical coding level q, signals that are transmitted, after assembly in the unit 1i, to the terminal i.

Each processing unit 212 to 243 is controlled by a control unit 20 whose function is to determine the hierarchical coding level q to be applied to the corresponding terminal j in view of its transmission over the corresponding output link LSi based on decisional criteria tied to the system such as the number of terminals in the conference, the capacity in terms of bandwidth or static and/or dynamic rate of the link LSi to the terminal i, the access rights of the terminal i, the rate transmitted by a terminal j, etc. The unit 20 can determine these decisional criteria based on information that is transmitted to it by the network (arrow A), by bandwidth evaluation units used on the respective input links LE1 to LE4 and/or even by the available bandwidth evaluation units 41 to 44 on the respective output links LS1 to LS4. These evaluation units are, for example, of the type RTCP (Real Time Control Protocol) in case of real time IP flows.

We now propose a mode of operation of the control unit 20 when it acts solely based on information related to the available bandwidths allocated to the links LS1 to LSN between the bridge 10 and the terminals 1 to N. This available bandwidth information has two components: a static component and a dynamic component.

By static component we mean the knowledge of a theoretical available bandwidth for each terminal. This information can either be positioned by an administrator of the bridge 10 and of the conference (arrow A), or be supplied transparently via an information exchange between the terminal concerned and the bridge 10 at the time this terminal is connected to the bridge 10. The value of this theoretical bandwidth may be defined more particularly based on the access rights of the terminal considered, its calculation capacities, the physical bandwidth available, etc.

As for the dynamic information, it corresponds to a continuous knowledge of the available bandwidth on an output link LSi. As we saw previously, this information can, for example, be evaluated by means of evaluation units 41 to 44 that can be of the RTCP type (Real Time Control Protocol) for real time IP flows.

In the remainder of the document, we will use the term "available bandwidth" to designate any combination of these two components. This available bandwidth will be referenced Bpi, i being the index of the link concerning this bandwidth.

The strategy then implemented by the control unit 20 therefore takes into account only the information concerning available bandwidths Bpi on the output link Lsi of the bridge 10 to a terminal i as well as the information concerning the number N of terminals participating in the conference.

We therefore assume here that the number of terminals is N and that the maximum number of hierarchical levels is P. We also define the useful rate $DU^q_i$ for a terminal i to receive the flows of the N−1 other terminals, flow at a hierarchical level q, a rate that breaks down, on the one hand, into the sum of the rates DHq necessary for the transmission at the hierarchical level q of the useful information coming from the other terminals j (j=1 to N, j≠i), which is located in the payload of the packets transmitted and, on the other hand, of the rate tied to the headers of the packets transmitted, generally called packet header overhead and referenced as Dh here.

The expression of the useful rate Dui to terminal i can therefore be written as follows: [

$$DU^q_i = Dh + DHq = Dh + (N-1)\sum_{1}^{q} Dp$$

In the case of a multiplexing bridge, where, using the packets received from the other terminals new packets intended for a terminal i are assembled, the packet header overhead Dh tied to the headers of the packets transmitted is independent of the number of terminals in the conference. The header rate Dh therefore represents the rate of the headers of the flows transmitted over the link considered, denoted Ds. We therefore have:

$$DU^q_i = Ds + (N-1)\sum_{1}^{q} Dp$$

In the case of a replicating bridge where each packet received from a terminal is replicated to the other terminals, the rate Dh tied to the headers of the packets transmitted to a terminal i is proportional to the number of flows transmitted to the bridge 10, that is, to the number of terminals other than the terminal concerned. We therefore have $$Dh = (N-1)Ds$$

where Ds is the header rate of the packets of the outgoing flows. The useful rate $DU^q_i$ for a terminal i can thus be written as follows:

$$DU^q_i = (N-1)\left(De + \sum_{1}^{q} Dp\right)$$

If we use $DG^q_i$ to denote the global rate of the terminal j as it appears in the outgoing flows to a terminal i at hierarchical level q, where i≠j, we can write:

$$DU^q_i = \sum_{j=1 \text{ à } N, j \neq i} DG^q_j$$

We note that in either of the expressions given above, the rate $DU^q_i$ useful to a terminal i is a function of the hierarchical level q of the data it receives.

According to the first mode of embodiment of the invention, if the available bandwidth Bpi on the output link LSi to the terminal i is less than the useful rate $DU^{q+1}_i$ to terminal i for flows at hierarchical level q+1, but greater than or equal to this rate $DU^q_i$ for flows at hierarchical level q, then the control unit 20 controls the processing units 2ij (with j≠i) so that the audio/video/data flows coming from the terminals j are truncated at hierarchical level q.

For example, for P=3, we can write:

If the available bandwidth Bpi to the terminal i is greater than or equal to the useful rate $DU^3_i$ necessary for the transmission of N−1 flows at the rate corresponding to hierarchy 3 (Bpi≧$DU^3_i$;=Dh+(N−1)(D1+D2+D3), the terminal i in question receives all the flows from the other terminals j (j≠1) without truncation.

If the available bandwidth BPi on the output link LSi to the participant terminal i is less than the useful rate DU3i, but greater than or equal to $DU^2_i$ ($DU^3_i$>BPi≧$DU^2_i$), the terminal i receives all the flows of the other terminals j (j≠i) with at least a truncation at hierarchical level 2.

If the available bandwidth BPi on the output link LSi to the participant terminal i is less than the useful rate $DU^2_i$, but greater than or equal to $DU^1_i$ ($DU^2_i$>Bpi≧$DU^1_i$), terminal i receives all the flows from the other terminals j (j#i) with at least a truncation at hierarchical level 1.

We will now describe an implementation example of the strategy that has just been defined. To simplify the description, we will place ourselves in an IP network and audio conference context with a replicating bridge. The other cases, particularly the case of the multiplexing bridge, can be easily extrapolated from this description.

To begin, let us therefore assume an audio conference with four participating terminals 1 to 4. These four terminals are already connected to the bridge 10 and have declared the respective bandwidths available BP1, BP2, BP3 and BP4. The audio conference uses a 3-level hierarchical coder thus offering a useful peak rate of D=D1+D2+D3 and hierarchical substrates D1, D2 and D3 in an IP network context. The packet header overhead of the outgoing flows Ds corresponds, for example, to the header IP/UDP/RTP for real time audio flows. An audio packet comprising an audio frame, in the case of an IP/UDP/RTP flow, generally comprises a header of 40 bytes, which therefore implies a packet overhead of 8 kbit/sec for frames of 40 ms (40 bytes*8 bits/40 ms).

To illustrate this decision strategy implemented, we will place ourselves in the case where we use audio frames of 40 ms for which the packet header overhead of the outgoing flows Ds is equal to 8 kbits/sec. We will assume that D1=8 kbit/s, D2=6 kbit/s, D3=16 kbit/s, and we will consider the available bandwidths declared to be BP1=56 kbits/s, BP2=96 kbits/s, BP3=128 kbits/s, and BP4=256 kbit/s.

To illustrate all the cases that present themselves, we have included below a two-dimensional table of size N×N where N is the number of terminals participating in the conference. For a given terminal i, the lines represent the maximum rates that can be received from each of the other terminals; the columns represent the maximum rates that a terminal i can send to the other terminals, seen from the level of the bridge 10.

|          | Terminal 1 | Terminal 2 | Terminal 3 | Terminal 4 |
|----------|------------|------------|------------|------------|
| Terminal 1 → |  | $DG\frac{1}{2}=16$ | $DG\frac{1}{3}=16$ | $DG\frac{1}{4}=16$ |
| Terminal 2 → | $DG\frac{2}{1}=22$ |  | $DG\frac{2}{3}=22$ | $DG\frac{2}{4}=22$ |
| Terminal 3 → | $DG\frac{3}{1}=38$ | $DG\frac{3}{2}=38$ |  | $DG\frac{3}{4}=38$ |
| Terminal 4 → | $DG\frac{3}{1}=38$ | $DG\frac{3}{2}=38$ | $DG\frac{3}{3}=38$ |  |

The aggregate bit rates $DG^1i$; of 16 kbit/s correspond to hierarchy 1 (8+8 kbit/s), those $DG^2i$; of 22 kbit/s correspond to hierarchy 2 (8+8+6 kbit/s) and those $DG^3i$; of 38 kbit/s correspond to hierarchy 3 (8+8+6+16 kbit/s).

This table indicates, for example, that the bridge 10 will transmit the flow coming from terminal 1 to terminals 3 and 4 as is and that, on the other hand, the flows coming from the other terminals 2 to 4 and directed toward terminal 1 are truncated at hierarchy level 1. We will therefore eliminate the data groups at the hierarchical levels higher than the hierarchical level concerned, in this case, level 1. Thus, the truncation is made by a simple elimination of a part of the payload of the IP packets going to terminal 1. An update of the associated headers vis-à-vis the length of the packet and the CRC in particular may be necessary.

We note that in the strategy that has just been described, we assumed that all the flows emitted by the terminals 1 to 4 are sent to the bridge 10 with an identical hierarchical level, for example, the highest level possible. If this is not the case, then this strategy results in a loss of efficacy. Indeed, if the bridge determines that it can transmit hierarchy 2 from terminal 1 to terminal 2, but in reality terminal 1 only sends hierarchy 1 to the bridge 10, the bridge 10 then obviously only sends hierarchy 1 to terminal 2. A second strategy defined below makes it possible to eliminate this problem.

This other strategy, in addition to taking into consideration the available bandwidth BPi information from the bridge 10 to each terminal i and the information concerning the number N of terminals participating in the conference, also takes into account the information about the rates DEj transmitted by each terminal j (j=1 to N, j≠1) to the bridge 10. As was already mentioned earlier, this last bit of information can be transmitted by the terminals to the bridge 10 or it can be evaluated by means of evaluation units 31 to 34 associated respectively with the input links LE1 to LE4.

According to the second mode of embodiment of the invention, if the available bandwidth on the output link LSi to the terminal i is less than the sum of the rates of the flows sent by the (N−1) other terminals j (j≠i), then no truncation is envisioned for these flows. If this is not the case, the flows of higher hierarchical levels (for example p) have their hierarchical level that, by truncation, is decremented by one unit (p−1). The comparison is made again until no further truncation is necessary.

The packet overhead tied to the headers of the packets of the flows sent is mutualized or not depending on the type of bridge considered. More specifically, it is mutualized in the case of a multiplexing bridge and it is not in the case of a replicating bridge.

To illustrate this strategy, we will place ourselves, as previously, in the case of replicating bridge (sic) and also in the case where one uses audio frames of 40 ms for which the packet header overhead Ds is equal to 8 kbit/s. We will assume D1=8 kbit/s, D2=6 kbit/s, D3=16 kbit/s, and we will consider the available bandwidths BP1 to BP4 (for example the declared bandwidth) on the links LS1 to LS4 to be equal respectively to BP1=56 kbit/s, BP2=64 kbit/s, BP3=96 kbit/s, and BP4=28 kbit/s.

The rate transmitted $DE^qj$ by a terminal j is the sum of the rate of the payloads of the packets that it transmits depending on the hierarchical level of the information contained in these payloads and the rate De of the headers of these packets of the incoming flows. For a hierarchical level q we can therefore write:

$$DE_j^q = De + \sum_1^q Dp$$

In the following illustrative example, we will assume the terminal 1 transmits using hierarchy 1 (we can therefore write $DE^1i=De+D1=8+8$ kbit/s=16 kbit/s), that terminals 2 and 4 transmit using hierarchy 3 (we can thus write: $DE^3{}_2=DE^3{}_4=De+D1+D2+D3=8+8+6+16=38$ kbit/s) and that terminal 3 transmits using hierarchy 2 (we can therefore write: $DE^2{}_3=De+D1+D2=8+8+6=22$ kbit/s.

As previously, we have included a table below to illustrate all the cases that may arise.

|  | Terminal 1<br>$DE\frac{1}{1}=16$ | Terminal 2<br>$DE\frac{3}{2}=38$ | Terminal 3<br>$DE\frac{2}{3}=22$ | Terminal 4<br>$DE\frac{3}{4}=38$ |
|---|---|---|---|---|
| Terminal 1 → |  | $DG\frac{1}{2}=16$ | $DG\frac{1}{3}=16$ | $DG\frac{1}{4}=16$ |
| Terminal 2 → | $DG\frac{1}{1}=16$ |  | $DG\frac{2}{3}=22$ | $DG\frac{2}{4}=22$ |
| Terminal 3 → | $DG\frac{1}{1}=16$ | $DG\frac{3}{2}=38$ |  | $DG\frac{3}{4}=38$ |
| Terminal 4 → | $DG\frac{1}{1}=16$ | $DG\frac{3}{2}=38$ | $DG\frac{2}{3}=22$ |  |

If we consider the available bandwidth BP 1 from the bridge 10 to terminal 1 (56 kbits/s) we can note that it is less than the rate $DU_1$ useful to terminal 1 to receive all the flows sent by the (N−1) other terminals (sum equal to 38+22+38=98 kbits/s) at their respective hierarchical levels. We then decrement the highest value hierarchies (in this case, the one used by terminals 2 and 4). The rate $DU_1$ useful to terminal 1 for receiving all the flows coming from the other terminals at these new hierarchical levels is therefore now 22+22+22=66 kbits/s. The available bandwidth BP1 from the bridge 10 to terminal 1 is still lower than the useful rate $DU_1$. We further decrement the highest hierarchies, in this case all of them. The useful rate $DU_1$ is now equal to 16=16+16=48 kbits/s. The available bandwidth from terminal 1 is now greater than this sum. The flows coming from the terminals are therefore truncated in order to have this rate.

If we consider the available bandwidth BP2 from the bridge 10 to terminal 2 (64 kbits/s), we can note that it is less than the rate $DU_2$ useful to terminal 2 for receiving all the flows sent by the (N−1) other terminals (16+22+38=76). We then decrement the highest hierarchies (in this case the one used by terminal 4). The rate $DU_2$ useful to terminal 2 for receiving all the flows coming from the other terminals at these new hierarchical levels is therefore now 16+22+22=60 kbits/s. The available bandwidth BP2 from the bridge 10 to terminal 2 is now greater than this useful rate $DU_2$. The flow coming from terminal 4 is therefore truncated in order to have this rate.

We now present an embodiment variant of the invention in which we assign a priority index to each flow transmitted by the terminals and we decrement the coding hierarchy level in reverse order of the priority indices. We will note that this priority index can be simply binary (priority/non-priority) of more complex, for example defining priority classes.

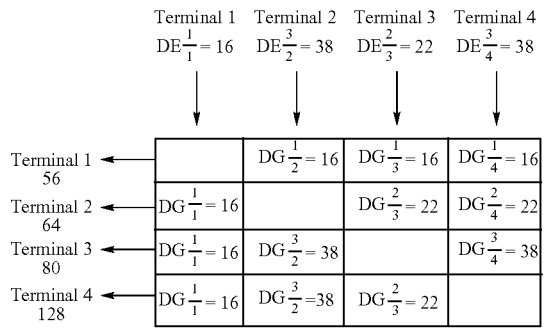

If we consider an available bandwidth BP3 from the bridge 10 to terminal 3 now equal to 80 kbits/s instead of 96 kbits as previously, we can note that it is less than the rate $DU_3$ useful to terminal 3 for receiving all the flows from the other terminals at their new respective hierarchical levels (16+38+38=92 kbits/s) According to the preceding method (without any priority index), we then decrement the highest hierarchies (in this case, the one used by terminals 2 and 4). The rate $DU_3$ useful to terminal 3 is now equal to 16+22+22=60 kbit/s, which is much lower than bandwidth BP3. We should therefore use hierarchical levels 1 for the flow coming from terminal 1 and hierarchical levels 2 for the flows coming from terminals 2 and 4.

Now, if we assume that terminal 2 has priority over the other terminals, we will decrement only the hierarchy of terminal 4. The rate $DU_3$ useful to terminal 3 is now equal to 16+38+22=76 kbits/s, which is also less than the bandwidth BP3. In this case, we will use hierarchical levels 1 for the flow coming from terminal 1, hierarchical level 3 for the flow coming from terminal 2 and hierarchical level 2 for the flow coming from terminal 4.

This last optimization feature can be implemented particularly in cases where priority information requires only an increase of limited complexity. The priority index is, for example, positioned in the payload of the packet or in the header of the packet itself or communicated by the network or the network administrator to the control unit 20 (arrow A).

The methods described above are implemented by the control unit 20 whenever the information on the available bandwidths is modified, whenever a terminal enters or leaves the conference and/or whenever the hierarchical levels of the flows transmitted by the terminals change. They are thus implemented whenever new information is communicated to the control unit 20, for example by the network or the network administrator (arrow A).

More specifically, when a new terminal asks to enter the conference, but at least one of the terminals already connected has a limited capacity, the request from this new terminal is rejected. The same is true when this new terminal is going to be in a packet overhead situation on its output link in case of connection. In all the other cases, the terminal is accepted and the strategies described above are implemented.

In the examples given above, we saw the application of these strategies for a hierarchical audio coder, but it can easily be extrapolated to a hierarchical video coder, where this time we consider the peak rates of the hierarchical levels. Indeed, quite often, the rates of video coders fluctuate based on the quantity of movements in the image with, nevertheless, a maximum rate, called the peak rate. In the case of hierarchical video coders, we can define maximum rate levels for each hierarchical level.

In the case of a videoconference with hierarchical audio and video coders to apply the strategies above, we can define hierarchical levels by combining the hierarchical levels of the audio coder and the video coder.

In the same way, this hierarchical management can be applied to all hierarchical bit streams transiting through the bridge, whether this flow represents audio, video or other types of data.

In FIG. 4 we have represented a mode of embodiment of a conference system according to the invention that is more suited to the mixing bridge. In this FIG. 4, we can see that the bridge 10 comprises assembly units 11 to 14 whose function is to mix the audio flows that come from the terminals and to deliver a single mixed audio flow to the associated terminal. Generally, these assembly units 11 to 14 are included in a single functional unit 15. We will note that in this type of bridge each terminal i receives only one audio flow (in the case of an audio conference) and also only one video flow in the case of a videoconference.

Prior to this delivery, the audio flow delivered by each assembly unit 11 to 14 is processed by a corresponding processing unit 21 to 24 whose essential function is to truncate or not truncate the assembled flows coming from the assembly units 11 to 14 and to deliver the flows with a hierarchical coding level determined by the control unit 20. As in the preceding example of embodiment, the control unit 20 acts based on decision-making criteria themselves determined based on information coming from the network (arrow A), information relating to the available bandwidth BP1 to BP4 on the output links LS1 to LS4 delivered by evaluation units 41 to 44.

This type of mode of embodiment is more specifically suited to the implementation of the first method described above. Indeed, the decision of the hierarchy level to be applied to a flow on an output link LSi is made only as a function of the static and/or dynamic capacities of the terminal i toward which this flow is transmitted. Depending on the capacity of the link LSi to the terminal i at a given moment, the bridge 10 will decide on the hierarchical level to be transmitted to this terminal i.

We will further note that the assembly units 11 to 14 can, prior to the summation of the audio flows on their inputs, select the most active flows in order to make it possible to manage conferences with many participants and therefore many terminals. Thus, the participants whose signals are the most active receive this summation less their signal. For video, they choose the video of the most active path (switched video) or* compose a video from the most active paths.

By using hierarchical coders according to the invention, we only perform a single coding, but, as in the case of multiplexing or replicating bridges, upon sending to each participant, a decision concerning the hierarchical level to be sent is made by participant based on the available bandwidth between the bridge and this participant.

We will note in general that the invention also makes it possible here to manage disparities in the capacities of the participants at the level of the bridge and thus offers a quality of service (i.e., the quality of the audio and video signals)

equivalent to the best of the capacities of each participant seen individually and to the best of the system's capacities.

This invention makes it possible to mitigate the disadvantage of the conference system of the prior art where, in case of a capacity problem in the direction of at least one participant, we either fall back on a mode requiring less capacity and therefore a mode offering less quality that will be imposed on all the participants, or sacrifice the lowest capacity link. In this last case, for example, we continue to send data over the corresponding link without taking the problem into account, which clogs this link, resulting in packet losses. The customer in question then only receives the flow or flows with errors. He is therefore greatly penalized in terms of quality, and even incapable of participating in the conference. The invention eliminates this situation.

We will note that the principle of the invention can be adapted in the case of a terminal that, when receiving one or more hierarchical flows, may, based on decision-making criteria (calculation capacity, flow priority, etc.) decide on the hierarchical levels to be decoded to ensure optimal sound reproduction.

The invention claimed is:

1. Conference system of the type that comprises a bridge (10) to which a plurality of terminals (1 to 4) can be connected to participate in a conference, said bridge (10) being equipped to receive audio and/or video and/or data flows from each terminal (1 to 4) and retransmit them to the other terminals, wherein the flows transmitted by said terminals (1 to 4) are coded by means of hierarchical coders and wherein said bridge (10) is equipped with means (21 to 24, 210 to 243) for processing the audio/video/data flows coming from the terminals (j) so that they have a hierarchical level (q) in the flow intended for the terminal (i) and means (20) for determining said hierarchical level (q) based on decision-making criteria related to the status of said conference system, as a function of:
   a. a piece of dynamic information concerning the available bandwidth (BPi) on the output link (LSi) between said bridge (10) and said terminal (i); and
   b. the number (N) of terminals participating in the conference.

2. Conference system as claimed in claim 1, wherein said means (20) determine the hierarchical level q required for a terminal (i) when the available bandwidth (BPi) on the link (LSi) between the bridge (10) and the terminal (i) is less than the rate (DUq+1i) used by the terminal (i) to receive hierarchical level (q+1) but is higher than the rate (DUqi) used by the terminal (i) to receive hierarchical level q.

3. Conference system as claimed in claim 1, wherein said means (20) determine the hierarchical level q required for a terminal (i) based on information concerning its useful bandwidth (BPi) on the output link (LSi) between said bridge (10) and said terminal (i), the number (N) of terminals participating in the conference and based on information concerning the rates (DEqj) transmitted by each terminal (j) to the bridge (10) for hierarchical levels (q).

4. Conference system as claimed in claim 3, wherein said means (20) determine the hierarchical level (q) of the flow coming from a terminal (j) for a terminal (i) by proceeding in the following manner:
   a. if the available bandwidth (BPi) of the link (LSi) to the terminal (i) is less than the sum of the rates (DEqj) of the flows sent by the other terminals (j), the packet overheads tied to the headers of the packets of the flow coming from the terminals being mutualized or not depending on the type of bridge considered, then the hierarchical levels (q) of the flows are not modified,
   b. if this is not the case, the flows transmitted by the other terminals (j) that have the highest hierarchical level have their hierarchical level decremented by one unit (p=p−1),
   c. the available bandwidth (BPi) of the link (LSi) to the terminal (i) is again compared to the sum of the rates (DEqj) of the flows sent by the other terminals (j) with the hierarchical levels previously determined, the packet overheads tied to the headers of the packets of the flow coming from the terminals being mutualized or not depending on the type of bridge considered,
   d. if it is less, the hierarchical levels are not modified further,
   e. otherwise, steps b) and c) are repeated until the available bandwidth (BPi) of the link (LSi) to the terminal (i) is less than the sum of the rates (DUqi) of the flows sent by the other terminals (j) with the hierarchical levels previously determined.

5. Conference system as claimed in claim 4, wherein the flows transmitted by the terminals comprise a priority index and wherein step b) for decrementing the hierarchical levels of the highest level is performed on the flows coming from the terminals in the order of the priority indices assigned to said flows.

6. Conference system as claimed in claim 5, wherein said priority index is binary, or more complex, defining, for example, priority classes.

7. Conference system of the type that comprises a bridge (10) to which a plurality of terminals (1 to 4) can be connected to participate in a conference, said bridge (10) being equipped to receive audio and/or video and/or data flows from each terminal (1 to 4) and retransmit them to the other terminals, wherein the flows transmitted by said terminals (1 to 4) are coded by means of hierarchical coders and wherein said bridge (10) is equipped with means (21 to 24, 210 to 243) for processing the audio/video/data flows coming from the terminals (j) so that they have a hierarchical level (q) in the flow intended for the terminal (i) and means (20) for determining said hierarchical level (q) based on decision-making criteria related to the status of said conference system, as a function of:
   a. a piece of dynamic information concerning the available bandwidth (BPi) on the output link (LSi) between said bridge (10) and said terminal (i); and
   b. a priority index assigned to each terminal.

8. Conference system according to claim 7, wherein the flows transmitted by the terminals comprise said priority index and wherein said means (20) for determining said hierarchical level provide for decrementing the hierarchical levels of the highest level and is performed on the flows coming from the terminals in the order of the priority indices assigned to said flows.

9. Conference system according to claim 7, wherein said priority index is binary.

10. Conference system according to claim 7, wherein said priority index defines priority classes.

11. Conference system according to claim 7, wherein said means (20) for determining said hierarchical level (q) also takes account of the number (N) of terminals participating in the conference.

* * * * *

UNITED STATES PATENT AND TRADEMARK OFFICE
CERTIFICATE OF CORRECTION

PATENT NO.         : 7,432,950 B2                                           Page 1 of 4
APPLICATION NO.    : 10/493510
DATED              : October 7, 2008
INVENTOR(S)        : David Deleam et al.

It is certified that error appears in the above-identified patent and that said Letters Patent is hereby corrected as shown below:

In column 8, line 46 please delete "D=D1+D2+D3" and in its place --Dc=D1+D2+D3--

In column 9, lines 1 through 13 please delete
"

|  | Terminal 1 | Terminal 2 | Terminal 3 | Terminal 4 |
|---|---|---|---|---|
| Terminal 1 |  | $DG_2^1 = 16$ | $DG_3^1 = 16$ | $DG_4^1 = 16$ |
| Terminal 2 | $DG_1^2 = 22$ |  | $DG_3^2 = 22$ | $DG_4^2 = 22$ |
| Terminal 3 | $DG_1^3 = 38$ | $DG_2^3 = 38$ |  | $DG_4^3 = 38$ |
| Terminal 4 | $DG_1^3 = 38$ | $DG_2^3 = 38$ | $DG_3^3 = 38$ |  |

", and in its place
--

|  | Terminal 1 | Terminal 2 | Terminal 3 | Terminal 4 |
|---|---|---|---|---|
| Terminal 1 |  | $DG_2^1 = 16$ | $DG_3^1 = 16$ | $DG_4^1 = 16$ |
| Terminal 2 | $DG_1^2 = 22$ |  | $DG_3^2 = 22$ | $DG_4^2 = 22$ |
| Terminal 3 | $DG_1^3 = 38$ | $DG_2^3 = 38$ |  | $DG_4^3 = 38$ |
| Terminal 4 | $DG_1^3 = 38$ | $DG_2^3 = 38$ | $DG_3^3 = 38$ |  |

--

UNITED STATES PATENT AND TRADEMARK OFFICE
CERTIFICATE OF CORRECTION

PATENT NO. : 7,432,950 B2
APPLICATION NO. : 10/493510
DATED : October 7, 2008
INVENTOR(S) : David Deleam et al.

It is certified that error appears in the above-identified patent and that said Letters Patent is hereby corrected as shown below:

In column 10, lines 30 through 42 please delete

"

|  | Terminal 1<br>$DE_1^1 = 16$ | Terminal 2<br>$DE_2^3 = 38$ | Terminal 3<br>$DE_3^2 = 22$ | Terminal 4<br>$DE_4^3 = 38$ |
|---|---|---|---|---|
| Terminal 1 → |  | $DG_2^1 = 16$ | $DG_3^1 = 16$ | $DG_4^1 = 16$ |
| Terminal 2 → | $DG_1^1 = 16$ |  | $DG_3^2 = 22$ | $DG_4^2 = 22$ |
| Terminal 3 → | $DG_1^1 = 16$ | $DG_2^3 = 38$ |  | $DG_4^3 = 38$ |
| Terminal 4 → | $DG_1^1 = 16$ | $DG_2^3 = 38$ | $DG_3^2 = 22$ |  |

"

and in its place

--

|  | Terminal 1<br>$DE_1^1 = 16$ | Terminal 2<br>$DE_2^3 = 38$ | Terminal 3<br>$DE_3^2 = 22$ | Terminal 4<br>$DE_4^3 = 38$ |
|---|---|---|---|---|
| Terminal 1 ← |  | $DG_2^1 = 16$ | $DG_3^1 = 16$ | $DG_4^1 = 16$ |
| Terminal 2 ← | $DG_1^1 = 16$ |  | $DG_3^2 = 22$ | $DG_4^2 = 22$ |
| Terminal 3 ← | $DG_1^1 = 16$ | $DG_2^3 = 38$ |  | $DG_4^3 = 38$ |
| Terminal 4 ← | $DG_1^1 = 16$ | $DG_2^3 = 38$ | $DG_3^2 = 22$ |  |

--

UNITED STATES PATENT AND TRADEMARK OFFICE
CERTIFICATE OF CORRECTION

PATENT NO. : 7,432,950 B2
APPLICATION NO. : 10/493510
DATED : October 7, 2008
INVENTOR(S) : David Deleam et al.

Page 3 of 4

It is certified that error appears in the above-identified patent and that said Letters Patent is hereby corrected as shown below:

In column 11, lines 12 through 25 please delete
"

|  | Terminal 1 $DE\frac{1}{1}=16$ | Terminal 2 $DE\frac{3}{2}=38$ | Terminal 3 $DE\frac{2}{3}=22$ | Terminal 4 $DE\frac{3}{4}=38$ |
|---|---|---|---|---|
| Terminal 1 56 |  | $DG\frac{1}{2}=16$ | $DG\frac{1}{3}=16$ | $DG\frac{1}{4}=16$ |
| Terminal 2 64 | $DG\frac{1}{1}=16$ |  | $DG\frac{2}{3}=22$ | $DG\frac{2}{4}=22$ |
| Terminal 3 80 | $DG\frac{1}{1}=16$ | $DG\frac{3}{2}=38$ |  | $DG\frac{3}{4}=38$ |
| Terminal 4 128 | $DG\frac{1}{1}=16$ | $DG\frac{3}{2}=38$ | $DG\frac{2}{3}=22$ |  |

, "

UNITED STATES PATENT AND TRADEMARK OFFICE
CERTIFICATE OF CORRECTION

PATENT NO.        : 7,432,950 B2
APPLICATION NO.   : 10/493510
DATED             : October 7, 2008
INVENTOR(S)       : David Deleam et al.

It is certified that error appears in the above-identified patent and that said Letters Patent is hereby corrected as shown below:

and in its place
--

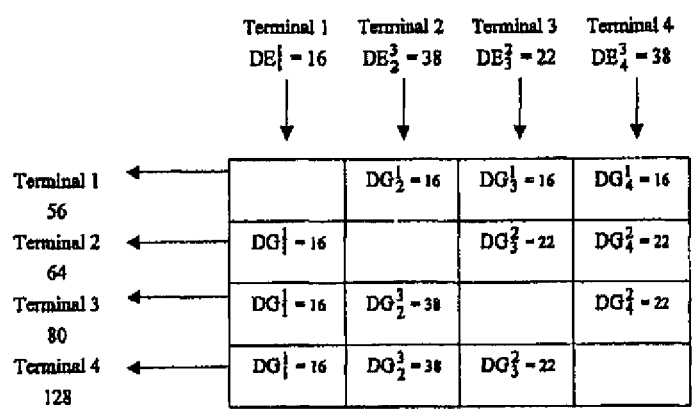

--

Signed and Sealed this

Eighth Day of September, 2009

David J. Kappos
*Director of the United States Patent and Trademark Office*